(12) United States Patent
Chengalva et al.

(10) Patent No.: US 7,334,243 B2
(45) Date of Patent: Feb. 19, 2008

(54) VANE INTEGRATION INTO MOTOR HUB TO ENHANCE CD COOLING

(75) Inventors: Suresh K. Chengalva, Carmel, IN (US); Scott E. Wilson, Kokomo, IN (US); Bruce A. Myers, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 150 days.

(21) Appl. No.: 11/214,634

(22) Filed: Aug. 30, 2005

(65) Prior Publication Data

US 2007/0050794 A1 Mar. 1, 2007

(51) Int. Cl.
*G11B 33/14* (2006.01)
(52) U.S. Cl. ...................................... 720/649
(58) Field of Classification Search ............... 720/649; 360/97.02, 97.03, 97.04, 99.12, 98.07
See application file for complete search history.

(56) References Cited

U.S. PATENT DOCUMENTS

| | | | | | |
|---|---|---|---|---|---|
| 4,369,475 | A | * | 1/1983 | Ho et al. | 360/97.02 |
| 4,633,349 | A | * | 12/1986 | Beck et al. | 360/97.02 |
| 4,660,110 | A | * | 4/1987 | Iida et al. | 360/97.03 |
| 4,873,594 | A | * | 10/1989 | Chen | 360/97.03 |
| 5,909,339 | A | * | 6/1999 | Hong | 360/98.07 |
| 6,556,376 | B1 | * | 4/2003 | Boutaghou | 360/99.12 |
| 2003/0151848 | A1 | * | 8/2003 | Lee | 360/97.02 |
| 2003/0179492 | A1 | * | 9/2003 | Kang et al. | 360/97.02 |

* cited by examiner

*Primary Examiner*—Tianjie Chen
(74) *Attorney, Agent, or Firm*—Jimmy L. Funke

(57) ABSTRACT

The present invention relates to the cooling of electronic components such as CD or DVD players and recorders and the disc or discs within. Specifically, the present invention relates to the internal cooling of a disc playing or recording device and the disc or discs within.

21 Claims, 4 Drawing Sheets

VANE INTEGRATION INTO MOTOR HUB TO ENHANCE CD COOLING

TECHNICAL BACKGROUND

The present invention relates to the cooling of electronic components of disc operating devices such as CD and DVD players and recorders and the cooling of the disc. Specifically, the present invention relates to the internal cooling of disc playing and/or recording devices and the disc or discs within.

BACKGROUND OF THE INVENTION

The electronics and optics inside disc operating devices such as compact disc (CD), digital video disc (DVD), and laser disc players and recorders experience high temperatures in operation. Radio units and entertainment units used in the automotive industry may include disc operating devices and additional units such as radios that may add to the heat inside the disc operating device. Typically, the method of cooling these units by convection includes placing an axial fan that mounts to the case of the unit at a position to cause air flow through the unit. This fan provides the necessary cooling to the components that are in the air flow path. Devices in the interior, however, may not be benefited from this cooling as the air flow path may be blocked in tight spaces.

SUMMARY OF THE INVENTION

One embodiment of the present invention includes a disc player for playing at least one of a compact disc, a digital video disc, and a laser disc, the disc player comprising a frame, a motor supported by the frame and configured to rotate the disc, a hub coupled to the motor and configured to support the disc, the hub including an upper surface adjacent to the disc and a lower surface, the lower surface including a vane extending downward, the vane configured to cool the disc player, and a reader supported by the frame and configured to read the disc.

Another embodiment of the present invention includes a method of cooling internal components of a disc operating apparatus, the method comprising the steps of providing a frame, a motor supported by the frame, a hub coupled to the motor and configured to support a disc, the hub including an upper surface adjacent to the disc and a lower surface, the lower surface including a vane extending downward, and a reader supported by the frame and configured to read the disc, and actuating the motor to rotate the hub.

Another embodiment of the present invention includes a hub for a disc operating apparatus, the hub configured to support and rotate a disc positioned on the hub, the hub including a first surface adjacent the disc, a second surface opposing the first surface, and a plurality of vanes coupled to the second surface.

Another embodiment of the present invention includes a disc player for playing at least one of a compact disc, a digital video disc, and a laser disc, the disc player comprising a frame, a motor configured to rotate the disc, a hub coupled to the motor and configured to support the disc, the hub including an upper surface adjacent to the disc and a lower surface, the lower surface including a vane extending downward, the vane configured to cool the disc and disc player, a frame positioned adjacent the lower surface of the hub, the frame including a first baffle configured to direct airflow to cool the disc and disc player, and a reader supported by the frame and configured to read the disc.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

Figure 1:
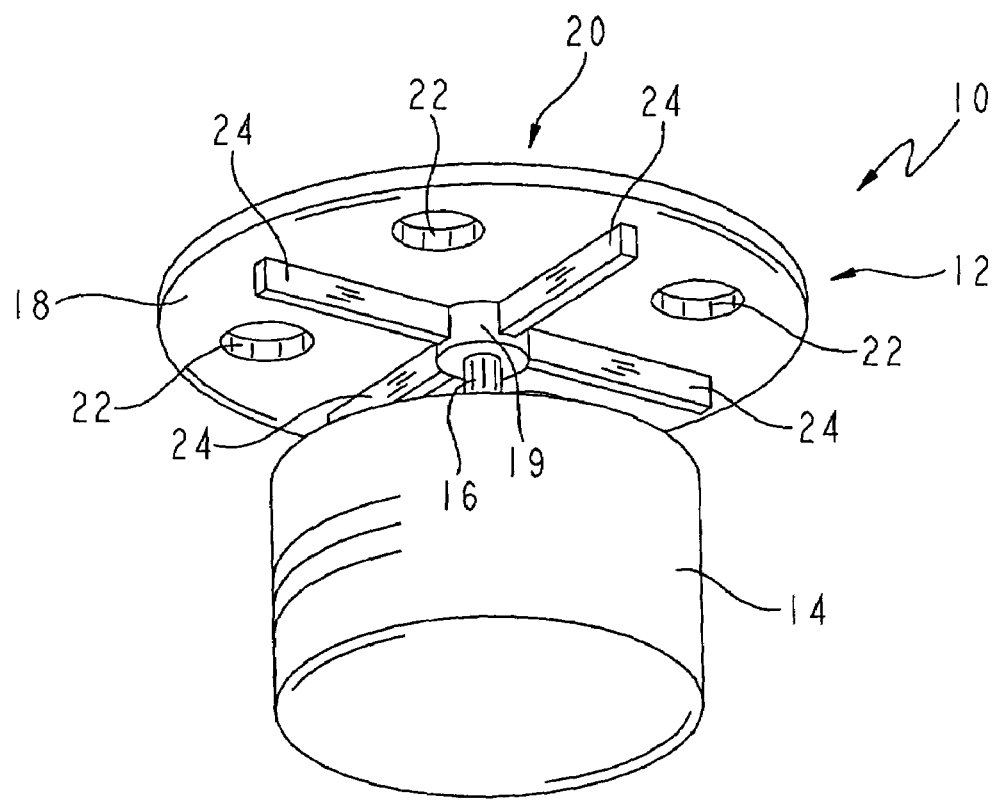
FIG. 1 is a perspective view of the lower side of one embodiment of a motor and hub of a disc operating device.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention in several forms and such exemplification is not to be construed as limiting the scope of the invention in any manner.

DESCRIPTION OF INVENTION

The embodiments discussed below are not intended to be exhaustive or limit the invention to the precise forms disclosed in the following detailed description. Rather, the embodiments are chosen and described so that others skilled in the art may utilize their teachings.

Figure 2:
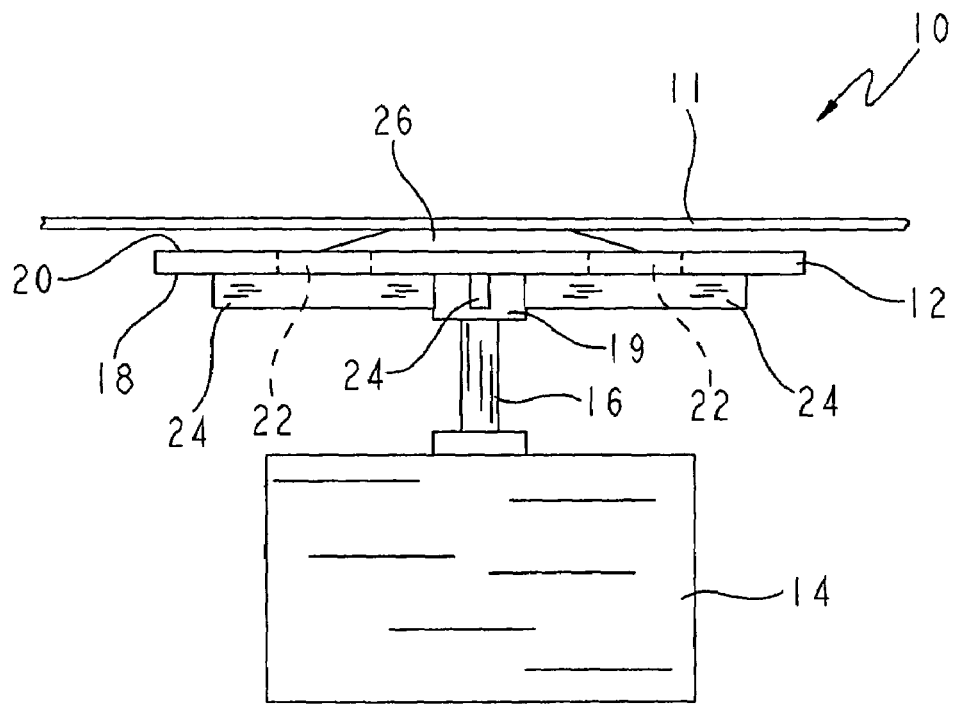
FIG. 2 is a profile view of the motor and hub shown in FIG. 1 with a disc positioned on the hub.

One embodiment of disc operating device 10 is shown in FIGS. 1 and 2. Disc operating device 10 includes motor 14 and hub 12. Motor 14 is supported by a frame (not shown) in disc operating device 10. Motor 14 is attached to a controller (not shown) and includes shaft 16. Shaft 16 is coupled to base 19 of hub 12. Hub 12 includes upper surface 20 and lower surface 18. Vanes 24 are coupled to lower surface 18 and extend radially outward from base 19. Raised portion 26 is formed on upper surface 20 of hub 12. Hub 12 also includes four apertures 22. In this embodiment, four vanes 24 are perpendicular to lower surface 18 of hub 12. Also, in this embodiment, hub 12 is formed from plastic, however steel, aluminum, or any other suitable material may be used. In other embodiments, more or fewer vanes may be used. Similarly, in other embodiments, more or fewer apertures may be used.

As shown in FIG. 2, disc 11 is supported by raised portion 26 of hub 12. In operation, motor 14 is actuated by a controller when disc operating device 10 is used. Motor 14 rotates shaft 16 which rotates hub 12 and disc 11. A reader, such as optical reading device 58 shown in FIGS. 7 and 8, supported by the frame, such as frame 52 shown in FIGS. 7 and 8, reads information stored on disc 11. In an alternative embodiment, a recorder or writing device is used to store information on disc 11. As should be understood from the foregoing, the reader or writer could be an optical reader/writer, a magnetic reader/writer, or any other suitable device.

In most disc operating devices the disc is rotated at relatively high speed. For example, a typical CD player motor spins a CD at about 5500 revolutions per minute (RPM). Rotating hub 12 to rotate disc 11 causes vanes 24 to act as an internal fan for disc 11 and disc operating device 10. Vanes 24 act to pull air between disc 11 and hub 12 through apertures 22. The air flow created by vanes 24 cools the disc 11 and/or internal components of disc operating device 10. Vanes 24 may cool disc operating device 10 enough that an axial fan such as that discussed above is not necessary. Alternatively, vanes 24 may have a curved or angled shape (e.g. FIGS. 3-4 and 5-6 or other configurations (not shown) for directing air in other directions).

Figure 3:
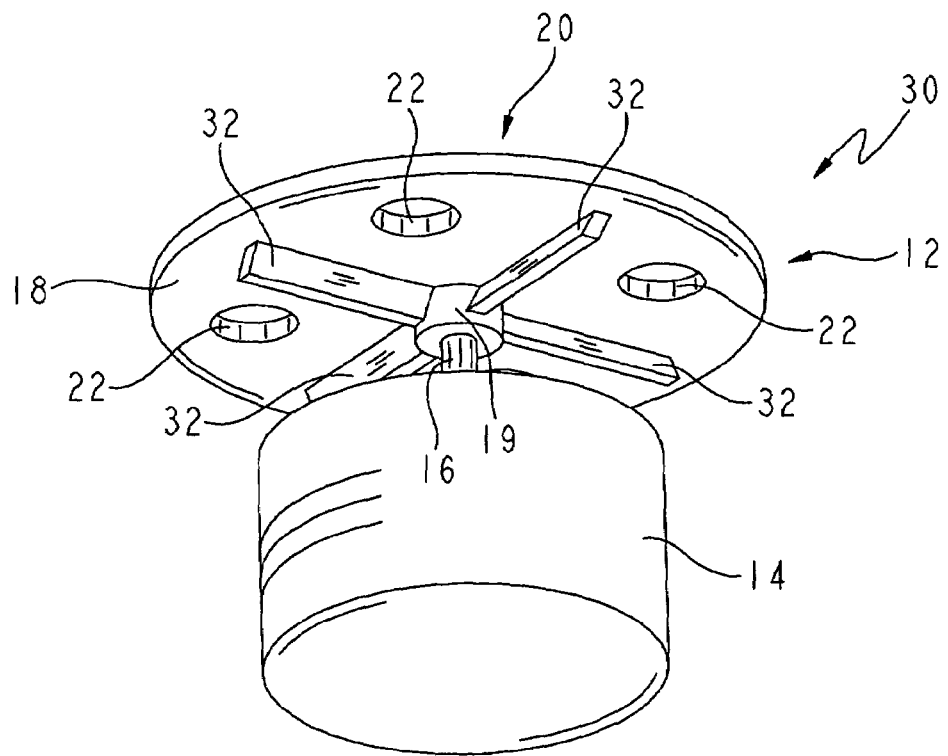
FIG. 3 is a perspective view of the lower side of one embodiment of a motor and hub of a disc operating device.
Figure 4:
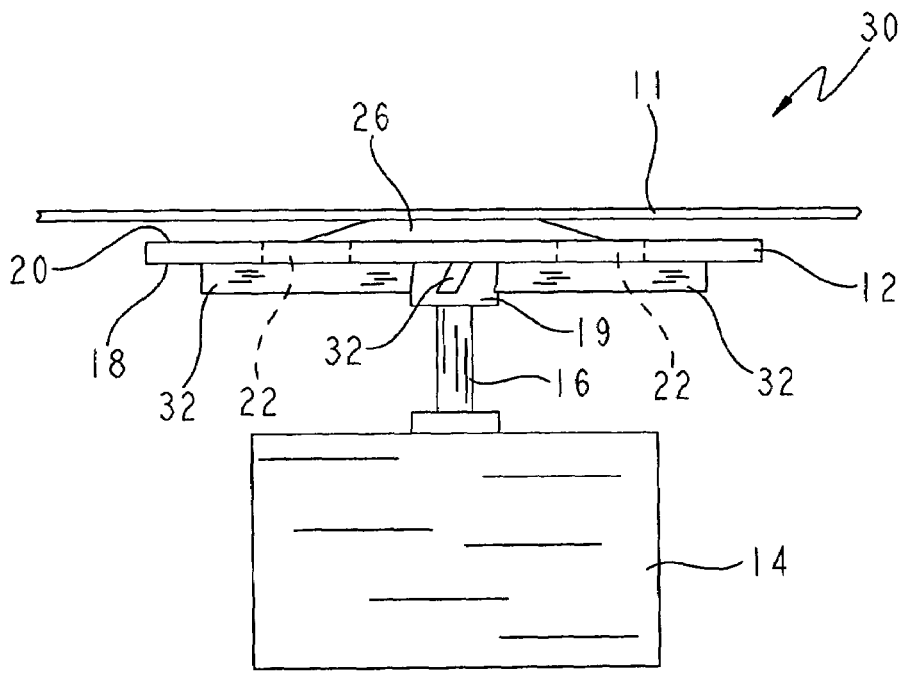
FIG. 4 is a profile view of the motor and hub shown in FIG. 3 with a disc positioned on the hub.

Another embodiment of a disc operating device is shown in FIGS. 3 and 4. Disc operating device 30 is substantially similar to disc operating device 10 in FIGS. 1 and 2 with the exception that vanes 24 have been replaced by vanes 32. Vanes 32 are coupled to lower surface 18 of hub 12 at an angle less than 90 degrees compared to vanes 24 which were perpendicularly coupled to lower surface 18. The slight tilting of vanes 32 may promote more air flow through disc operating device 30 than vanes 24. It should be understood that vanes 32 could be coupled to lower surface 18 at any desired angle.

Figure 5:
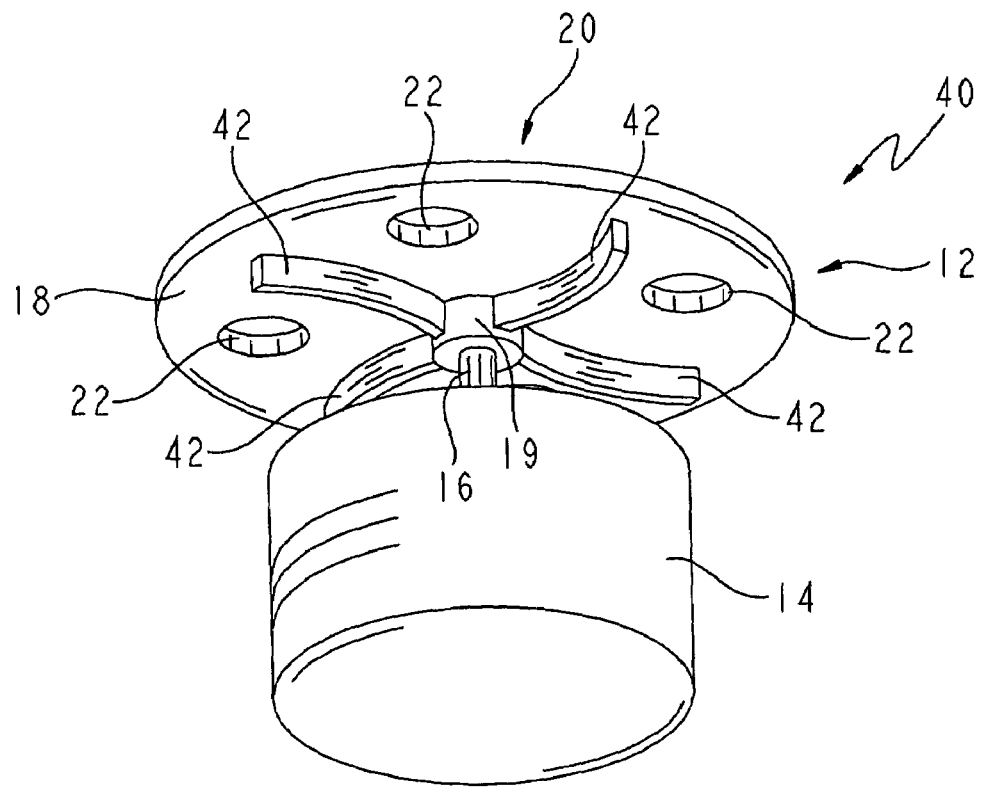
FIG. 5 is a perspective view of the lower side of one embodiment of a motor and hub of a disc operating device.
Figure 6:
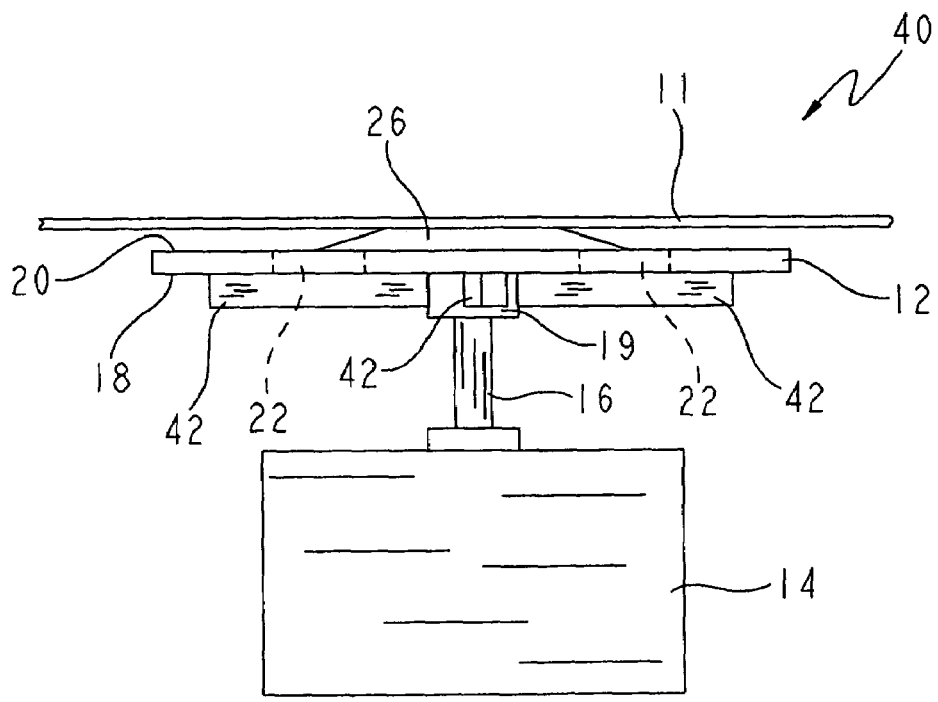
FIG. 6 is a profile view of the motor and hub shown in FIG. 5 with a disc positioned on the hub.

Another embodiment of a disc operating device is shown in FIGS. 5 and 6. Disc operating device 40 is substantially similar to disc operating device 10 in FIGS. 1 and 2 with the exception that vanes 24 have been replaced by vanes 42. Vanes 42 are coupled to lower surface 18 of hub 12 at an angle of about 90 degrees. Vanes 42 include a curved portion or surface 44 that may promote more air flow through disc operating device 40 than vanes 24. In other embodiments (not shown), vanes 42 may include multiple curved portions and may be angled similar to vanes 32 in FIGS. 3 and 4.

Figure 7:
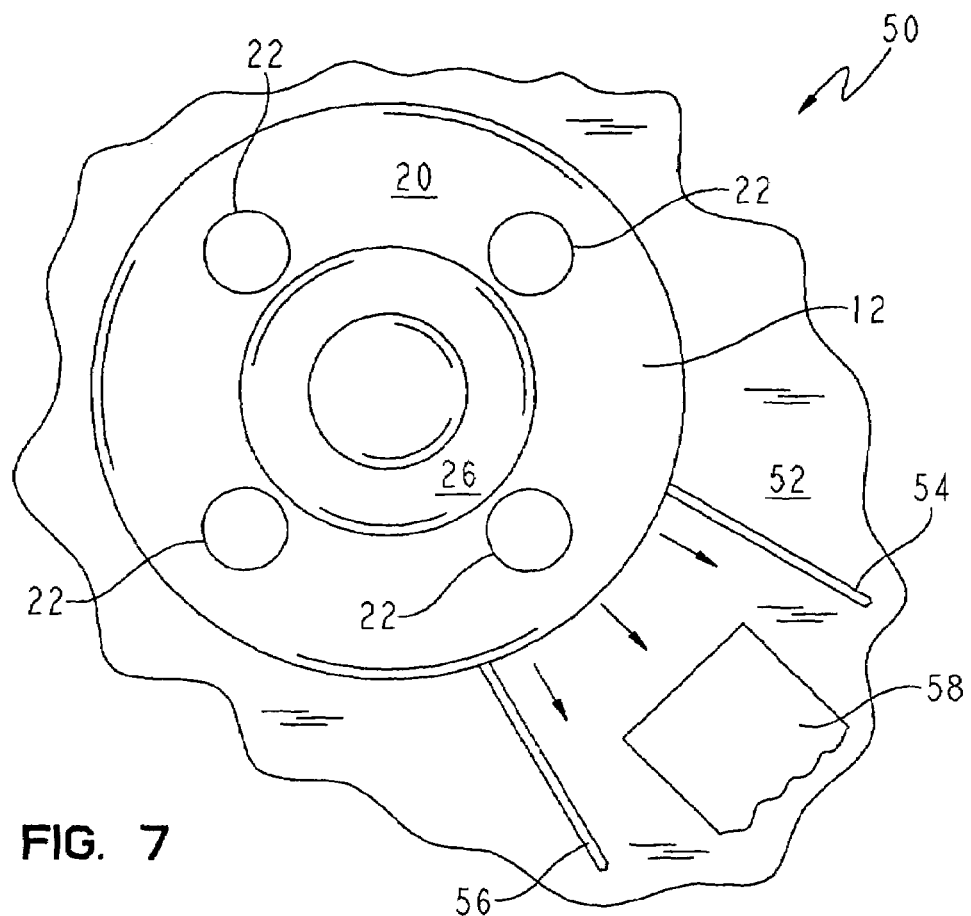
FIG. 7 is an overhead view of one embodiment of a disc operating device including the hub shown in FIGS. 1 and 2, an optical reading device, and a baffle system.
Figure 8:
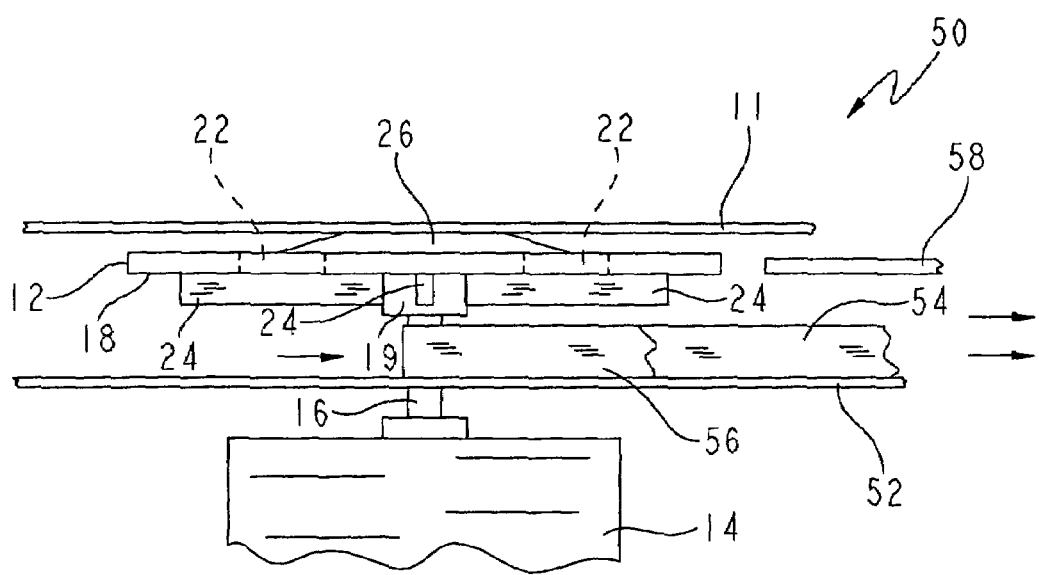
FIG. 8 is a profile view of the disc operating device shown in FIG. 7.

Another embodiment of a disc operating device is shown in FIGS. 7 and 8. Disc operating device 50 includes motor 14 and hub 12 of the embodiment shown in FIG. 1. Disc operating device 50 also includes frame 52, baffles 54 and 56, and optical reading device 58. Optical reading device 58 moves inward and outward across the bottom surface 18 of disc 11 toward the center of disc 11 as it rotates and "reads" the information stored on disc 11. In operation, optical reading device 58 and disc 11 may increase in temperature.

Frame 52 includes an aperture through which shaft 16 of motor 14 extends. Frame 52 is generally rigid and may support other components of disc operating system 50. Baffles 54 and 56 are coupled to frame 52 and extend outwardly from the aperture surrounding shaft 16. Baffles 54 and 56 extend upwardly from frame 52 to a position close to vanes 24 of hub 12. As described above, as disc 11 rotates, vanes 24 on bottom surface 18 of hub 12 create air movement to cool disc 11 and/or disc operating device 50. Baffles 54 and 56 are positioned on frame 52 to form a tunnel extending outwardly to direct airflow generated by vanes 24 of hub 12 toward optical reading device 58 and the portion of bottom surface 18 adjacent optical reading device 58. While vanes 24 shown in FIGS. 1 and 2 have been used in this embodiment, the vane configurations shown in FIGS. 3-6 may also be used with baffles 54 and 56. In other embodiments (not shown), more or fewer baffles may be used to direct airflow to a selected component of the disc operating system.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A disc player for playing at least one of a compact disc, a digital video disc, and a laser disc, the disc player comprising:
   a frame;
   a motor supported by the frame and configured to rotate the disc;
   a hub coupled to the motor and configured to support the disc, the hub including an upper surface adjacent to the disc and a lower surface, the lower surface including a vane extending downward, the vane configured to cool at least one of the disc and the disc player, wherein the hub includes an off-center aperture; and
   a reader supported by the frame and configured to read the disc.

2. The disc player of claim 1, further comprising a recorder configured to record information on the disc.

3. The disc player of claim 1, wherein the hub is constructed of plastic.

4. The disc player of claim 1, wherein the hub includes a plurality of vanes.

5. The disc player of claim 1, wherein the vane is substantially perpendicular to the lower surface.

6. The disc player of claim 1, wherein the vane is coupled to the hub at an angle less than 90 degrees.

7. The disc player of claim 1, wherein hub includes a center and the vane extends radially outward from the center of the hub.

8. The disc player of claim 1, wherein the vane includes a curved portion.

9. The disc player of claim 1, wherein the upper surface of the hub includes a raised center section configured to support the disc.

10. The disc player of claim 1, further comprising first and second baffles coupled to the frame and configured to direct airflow toward the reader.

11. A method of cooling internal components of a disc operating apparatus, the method comprising the steps of:
   providing a frame, a motor supported by the frame, and a hub coupled to the motor and configured to support a disc, the hub including an upper surface adjacent to the disc and a lower surface, the lower surface including a vane extending downward, and a reader supported by the frame and configured to read the disc, wherein the hub includes a plurality of off-center apertures configured to promote airflow between the disc and the hub; and
   actuating the motor to rotate the hub.

12. The method of claim 11, wherein the providing step includes having a hub including a plurality of vanes.

13. The method of claim 11, further comprising the step of providing a baffle configured to channel airflow toward the reader, the baffle positioned on the frame between the hub and the motor.

14. A hub for a disc operating apparatus, the hub configured to support and rotate a disc positioned on the hub, the hub including:

a first surface configured to support the disc;
a second surface opposing the first surface;
a plurality of vanes coupled to the second surface; and
a plurality of off-center apertures.

15. The hub of claim 14, wherein the hub is constructed of plastic.

16. The hub of claim 14, further comprising a raised central portion on the first surface.

17. The hub of claim 14, wherein a first vane of the plurality of vanes defines a first axis and a second vane of the plurality of vanes defines a second axis, the first axis perpendicular to the second axis.

18. The hub of claim 14, wherein each of the plurality of vanes has a curved profile.

19. A disc player for playing at least one of a compact disc, a digital video disc, and a laser disc, the disc player comprising:
   a motor configured to rotate the disc;
   a hub coupled to the motor and configured to support the disc, the hub including an upper surface adjacent to the disc and a lower surface, the lower surface including a vane extending downward, the vane configured to cool the disc and the disc player, wherein the hub includes an off-center aperture;
   a frame positioned adjacent the lower surface of the hub, the frame including a first baffle configured to direct airflow to cool at least one of the disc and the disc player; and
   a reader supported by the frame and configured to read the disc.

20. The disc player of claim 19, wherein the frame includes a second baffle configured to cooperate with the first baffle to form a channel, the channel configured to direct airflow toward the reader.

21. The disc player of claim 19, wherein the hub includes a plurality of off-center apertures.

* * * * *